UNITED STATES PATENT OFFICE.

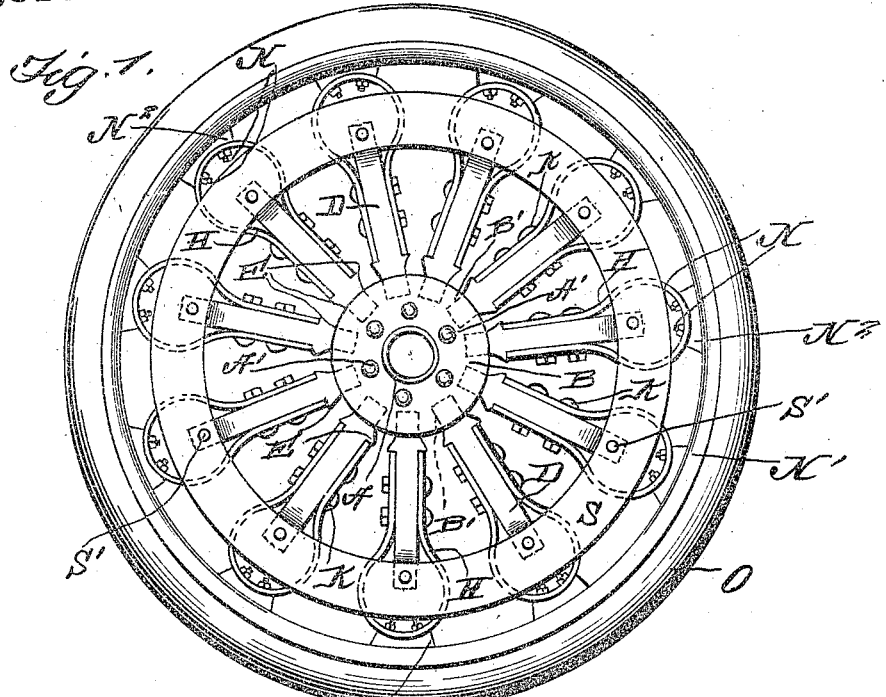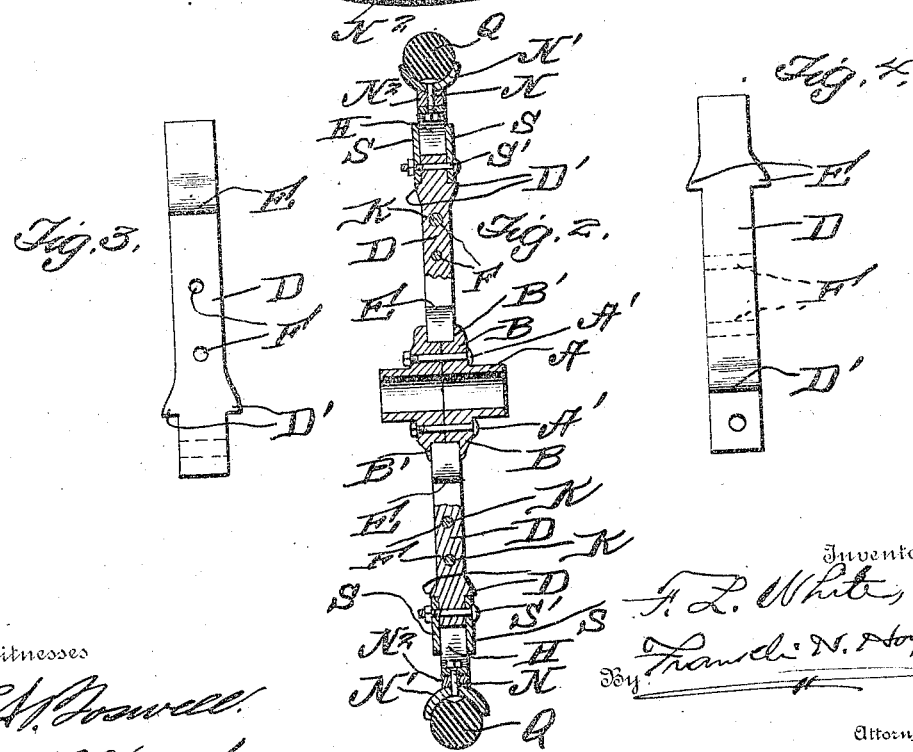

FRANK L. WHITE, OF LITTLE ROCK, ARKANSAS, ASSIGNOR OF ONE-HALF TO T. F. HUTCHINSON, OF LITTLE ROCK, ARKANSAS.

WHEEL.

979,816.  Specification of Letters Patent.  Patented Dec. 27, 1910.

Application filed March 8, 1910. Serial No. 548,007.

*To all whom it may concern:*

Be it known that I, FRANK L. WHITE, a citizen of the United States, residing at Little Rock, in the county of Pulaski and State of Arkansas, have invented certain new and useful Improvements in Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels for vehicles of various kinds adapted as a substitute for pneumatic wheels and comprises a simple and efficient device of this nature having various details of construction and combinations and arrangements of parts which will be hereinafter fully described and then specifically defined in the appended claim.

I illustrate my invention in the accompanying drawings, in which:—

Figure 1 is a side elevation of a wheel made in accordance with my invention. Fig. 2 is a sectional view transversely through the same. Fig. 3 is an enlarged detail in elevation of one of the spokes, and Fig. 4 is an edge view of the spoke.

Reference now being had to the details of the drawings by letter, A designates the bearing shell of the wheel and B hub sections carrying said bearing shell and provided with a series of radial recesses B' forming spoke sockets. Said sections B are held together by means of bolts A' passing through registering apertures therein, and D designates a series of spokes which are shown in side elevation and edge view as having the shoulders D' upon their opposite edges and shoulders or ribs E upon their flat faces, each of said spokes being provided with apertures F.

H designate springs, the ends of which are held against the opposite faces of the spokes by means of the bolts K passing through apertures F and registering apertures formed near the ends of the springs. The ends of said springs butt against the shoulders or ribs E, as shown clearly in Fig. 1 of the drawings, and their bowed portions are held by means of the bolts N to the rim N' intermediate which and the springs saddles N² are positioned. A suitable solid tire Q, preferably of rubber, is fastened to the periphery of said rim.

Rings, designated by letter S, are fastened to each of the spokes by means of bolts S', the inner marginal edges of said rings bearing against the shoulders D' formed adjacent to the outer ends of the spokes.

The operation of my device will be readily understood, the springs in succession yielding to take up vibration and returning to their normal position after the pressure is removed from the tread surface. Any pressure coming upon the springs will be thrown against the lugs or shoulders E upon the spokes and the bowed portions of the springs yielding, while the spokes are held securely in place by means of the two metallic rings bolted to the outer ends thereof.

By the provision of a wheel made in accordance with my invention, a simple and efficient means is afforded whereby the vibration may be taken up and pneumatic tires dispensed with. In the event of any of the springs or other parts of the wheel becoming broken, these may be easily replaced.

What I claim to be new is:—

A resilient wheel having a hub, a series of spokes fixed thereto, said spokes having shoulders upon opposite faces thereof adjacent to their outer ends, rings seated against said shoulders, fastening means passing through the outer ends of the spokes and said rings, said rings projecting beyond the ends of the spokes, shoulders on said spokes adjacent to said hubs and upon faces thereof opposite those in which the shoulders engaged by the rings are formed, bowed springs fastened to opposite faces of the spokes and their inner ends engaging said shoulders adjacent to the hub, a rim, concaved blocks fastened thereto and to which the bowed springs are fastened, the opposite edges of the springs adapted to contact with said rings as the springs yield.

In testimony whereof I hereunto affix my signature in the presence of two witnesses.

FRANK L. WHITE.

Witnesses:
S. R. ALLEN,
C. M. WALSEN.